US 12,448,275 B2

(12) United States Patent
Florian et al.

(10) Patent No.: US 12,448,275 B2
(45) Date of Patent: Oct. 21, 2025

(54) CAPACITIVE LINEARIZATION METHOD APPLIED TO MEMS MICROPHONES SYSTEMS

(71) Applicant: Infineon Technologies AG, Neubiberg (DE)

(72) Inventors: Wilfried Florian, Villach (AT); Niccoló De Milleri, Villach (AT); Richard Gaggl, Poertschach am Woerthersee (AT); Philipp Greiner, Graz (AT); Andreas Wiesbauer, Poertschach (AT)

(73) Assignee: Infineon Technologies AG, Neubiberg (DE)

( * ) Notice: Subject to any disclaimer, the term of this patent is extended or adjusted under 35 U.S.C. 154(b) by 696 days.

(21) Appl. No.: 17/806,345

(22) Filed: Jun. 10, 2022

(65) Prior Publication Data

US 2023/0399223 A1  Dec. 14, 2023

(51) Int. Cl.
*B81B 3/00* (2006.01)
*H02J 3/01* (2006.01)

(52) U.S. Cl.
CPC .............. *B81B 3/0021* (2013.01); *H02J 3/01* (2013.01); *B81B 2201/0257* (2013.01); *B81B 2203/0127* (2013.01); *B81B 2203/03* (2013.01); *B81B 2207/01* (2013.01)

(58) Field of Classification Search
CPC .......... B81B 3/0021; B81B 2201/0257; B81B 2203/0127; B81B 2203/03; B81B 2207/01; H02J 3/01; H04R 19/005; H04R 19/04; H04R 2410/03; H04R 3/04
See application file for complete search history.

(56) References Cited

U.S. PATENT DOCUMENTS

| | | | |
|---|---|---|---|
| 7,088,172 B1 | 8/2006 | Lesea et al. | |
| 8,638,249 B2 | 1/2014 | Kropfitsch et al. | |
| 10,222,407 B2 | 3/2019 | Steiner | |
| 10,873,295 B1 * | 12/2020 | Wilson | H03F 3/187 |
| 2003/0230997 A1 | 12/2003 | Hagen | |
| 2012/0121106 A1 * | 5/2012 | Henriksen | H04R 3/06 381/94.1 |
| 2013/0010990 A1 | 1/2013 | Sridharan et al. | |
| 2013/0015919 A1 | 1/2013 | Kropfitsch et al. | |

(Continued)

FOREIGN PATENT DOCUMENTS

| | | | | |
|---|---|---|---|---|
| CN | 101605287 A | * | 12/2009 | ............... H04R 3/00 |
| JP | 3786431 B2 | * | 6/2006 | ............... H03L 7/113 |

*Primary Examiner* — Oyesola C Ojo
(74) *Attorney, Agent, or Firm* — Slater Matsil, LLP

(57) ABSTRACT

A microphone includes a microelectromechanical system (MEMS) device responsive to sound waves or vibrations having an output coupled to a first node; a programmable gain amplifier or source follower having an input coupled to a second node, and an output for generating an analog signal, wherein the MEMS device output and the programmable gain amplifier or source follower input comprise a first nonlinear equivalent capacitance having a first capacitance-to-voltage (CV) profile; and a nonlinear capacitance component coupled to the first node, the second node, and at least one reference voltage node, wherein the nonlinear capacitance component comprises a second nonlinear equivalent capacitance having a second CV profile.

20 Claims, 8 Drawing Sheets

(56) References Cited

U.S. PATENT DOCUMENTS

| | | |
|---|---|---|
| 2013/0129117 A1* | 5/2013 | Thomsen ................. H03F 1/52 |
| | | 381/121 |
| 2013/0271307 A1* | 10/2013 | Kropfitsch ............. H03G 3/002 |
| | | 341/158 |
| 2014/0072150 A1 | 3/2014 | Liu et al. |
| 2014/0097906 A1 | 4/2014 | Jennings et al. |
| 2014/0266260 A1 | 9/2014 | Wurzinger et al. |
| 2015/0023529 A1* | 1/2015 | Barzen ................. H04R 19/005 |
| | | 381/174 |
| 2015/0318829 A1* | 11/2015 | Astgimath ............. H03F 3/505 |
| | | 330/291 |
| 2016/0149542 A1 | 5/2016 | Mucha et al. |
| 2018/0160233 A1* | 6/2018 | Yang ....................... H04R 3/00 |
| 2018/0332377 A1* | 11/2018 | Polo ....................... H03F 3/505 |
| 2019/0098417 A1 | 3/2019 | Littrell et al. |
| 2019/0326868 A1 | 10/2019 | Lin et al. |
| 2020/0252035 A1 | 8/2020 | Danioni |
| 2022/0306457 A1 | 9/2022 | Straeussnigg et al. |

* cited by examiner

CAPACITIVE LINEARIZATION METHOD APPLIED TO MEMS MICROPHONES SYSTEMS

TECHNICAL FIELD

The present invention relates generally to a capacitive linearization method applied to MicroElectroMechanical System (MEMS) microphone systems and to the corresponding MEMS microphone systems.

BACKGROUND

Single-ended MEMS microphones are known in the art. Single-ended MEMS microphones typically comprise a capacitive MEMS device including a static membrane and a flexible membrane that are used for converting ambient sound waves into an analog voltage between the two membranes. The analog signal from the MEMS device is initially amplified by a readout circuit including, for example a source follower amplifier. The amplified analog voltage is then typically converted into a digital signal, which is further processed by additional digital signal processing components. Single-ended MEMS microphones are widely used in many consumer applications with studio-quality audio for smartphone or earbud form factors, for example. However, at certain volume levels and operating frequencies single-ended MEMS microphones can suffer from prominent 2nd order harmonic distortion (HD2).

SUMMARY

According to an embodiment, a microphone comprises a microelectromechanical system (MEMS) device responsive to sound waves or vibrations having an output coupled to a first node; a source follower (or other suitable amplifier such as a programmable gain amplifier) having an input coupled to a second node, and an output for generating an analog signal, wherein the MEMS device output and the programmable gain amplifier or source follower input comprise a first nonlinear equivalent capacitance having a first capacitance-to-voltage (CV) profile; and a nonlinear capacitance component coupled to the first node, the second node, and at least one reference voltage node, wherein the nonlinear capacitance component comprises a second nonlinear equivalent capacitance having a second CV profile.

According to an embodiment, an integrated circuit comprises a first bias resistor coupled between an input pin and at least one reference voltage; a nonlinear capacitance component comprising a capacitor-connected transistor, wherein the nonlinear capacitance component is coupled to the input pin, an internal node, and at least one reference voltage node; and a source follower coupled to the internal node.

According to an embodiment, a method comprises, in a digital microphone comprising a MEMS device and a programmable gain amplifier or source follower, determining a first nonlinear equivalent capacitance of the MEMS device and the programmable gain amplifier or source follower, the first nonlinear equivalent capacitance having a first capacitance-to-voltage (CV) profile; and compensating the first nonlinear equivalent capacitance with a nonlinear capacitance component, wherein the nonlinear capacitance component comprises a second nonlinear equivalent capacitance having a second CV profile.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following detailed description, reference is made to the accompanying drawings, which form a part hereof and in which are shown byway of illustrations specific embodiments in which the invention may be practiced. It is to be understood that other embodiments may be utilized and structural or logical changes may be made without departing from the scope of the present invention. For example, features illustrated or described for one embodiment can be used on or in conjunction with other embodiments to yield yet a further embodiment. It is intended that the present invention includes such modifications and variations. The examples are described using specific language, which should not be construed as limiting the scope of the appending claims. The drawings are not scaled and are for illustrative purposes only. For clarity, the same or similar elements have been designated by corresponding references in the different drawings if not stated otherwise.

Single-ended MEMS microphones can exhibit prominent second order harmonic distortion (HD2) at low-mid input sound pressure levels. In MEMS microphones, converting the change in capacitance to an electrical signal is often done using a constant-charge readout approach, where the capacitance of the microphone is charged by a charge pump, which is a circuit that boosts the microphone supply voltage to higher voltages. In constant-charge readout approaches the HD2 is strongly related to the total equivalent parasitic capacitance at the connection node between MEMS itself and its readout Application-Specific Integrated Circuit (ASIC). Since the parasitic capacitance can never be completely eliminated, an HD2 compensation circuitry on the ASIC is needed to improve system linearity.

According to embodiments, an extra non-linear capacitor is added at the interface between the MEMS and ASIC in order to cancel out the MEMS intrinsic HD2. The added non-linear capacitor substantially balances the charge transfer between itself and the parasitic capacitance at the interface node. Keeping the sum of the charge constant over changing signal magnitudes results in a HD2 compensation. Embodiment circuits and a corresponding method are described in greater detail below.

Figure 1:
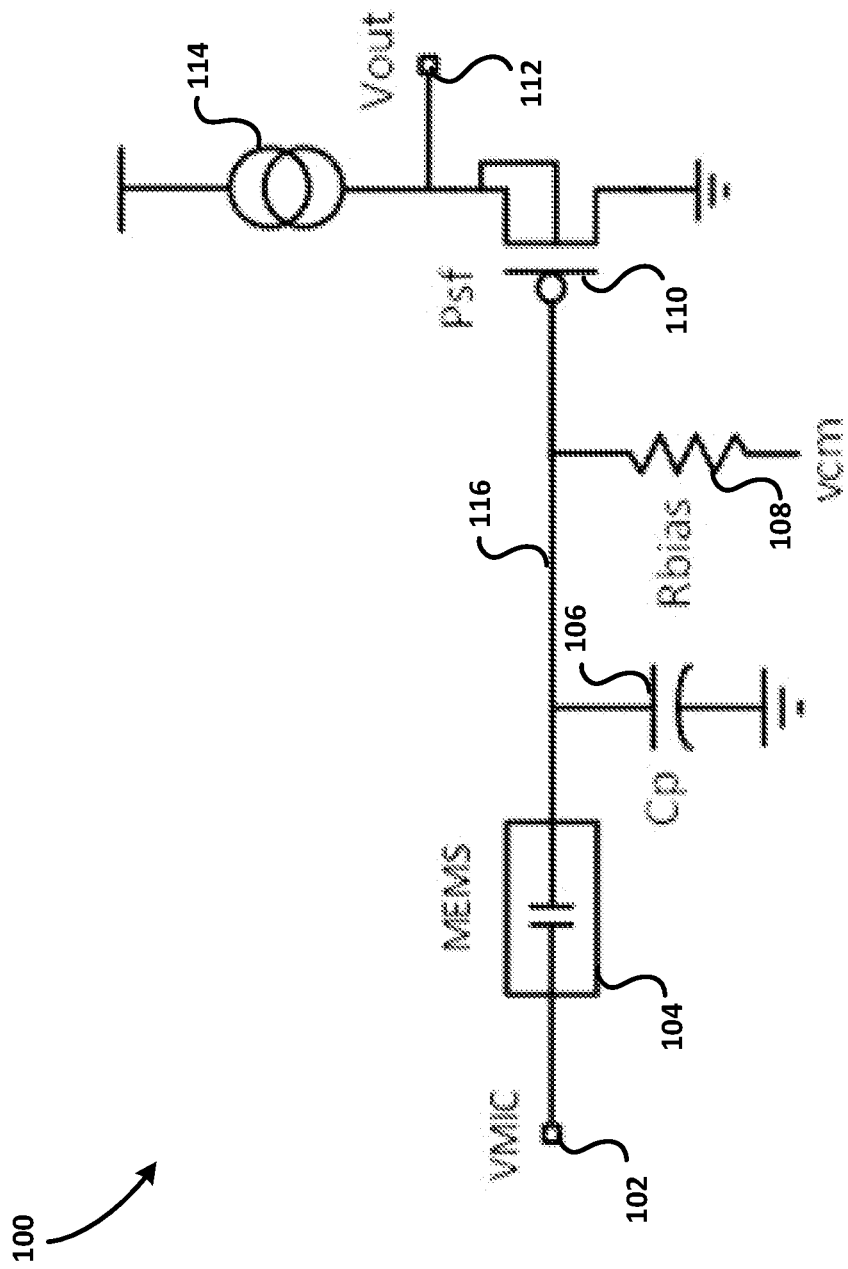
FIG. 1 is a schematic diagram of an exemplary MEMS microphone readout circuit.

FIG. 1 shows a typical MEMS microphone readout scheme. One side (back-plate) of the single-ended MEMS sensor is connected to a source follower circuit, made in this case by a PMOS transistor. The equivalent parasitic capacitor is also drawn in the figure, noted as Cp.

FIG. 1 shows a schematic diagram of an exemplary MEMS microphone readout circuit 100, including a MEMS capacitive sensor 104. MEMS capacitive sensor 104 receives a bias voltage VMIC at node 102 for appropriately biasing the static and moveable membranes of the sensor. The output of MEMS capacitive sensor 104 is coupled to interface node 116. The equivalent parasitic capacitor is shown as a lumped element coupled to interface node 116, noted as parasitic capacitor Cp. A bias resistor $R_{BIAS}$ 108 is coupled between node 118 and a source of common mode voltage ($V_{CM}$). The gate of a source follower transistor $P_{SF}$ 110, which is a PMOS transistor, is also coupled to interface node 116. The source of source follower transistor $P_{SF}$ 110 provides the low impedance output voltage at output node 112 ($V_{OUT}$), and to a bias current source 114. The drain of source follower transistor $P_{SF}$ 110 is coupled to ground. It is important to note that the bulk terminal of the source follower transistor $P_{SF}$ 110 is shorted to the source terminal at output node 112. This is a conventional configuration of a PMOS source follower transistor, with the purpose of eliminating the body effect and thus the corresponding potential distortion.

Figure 2:
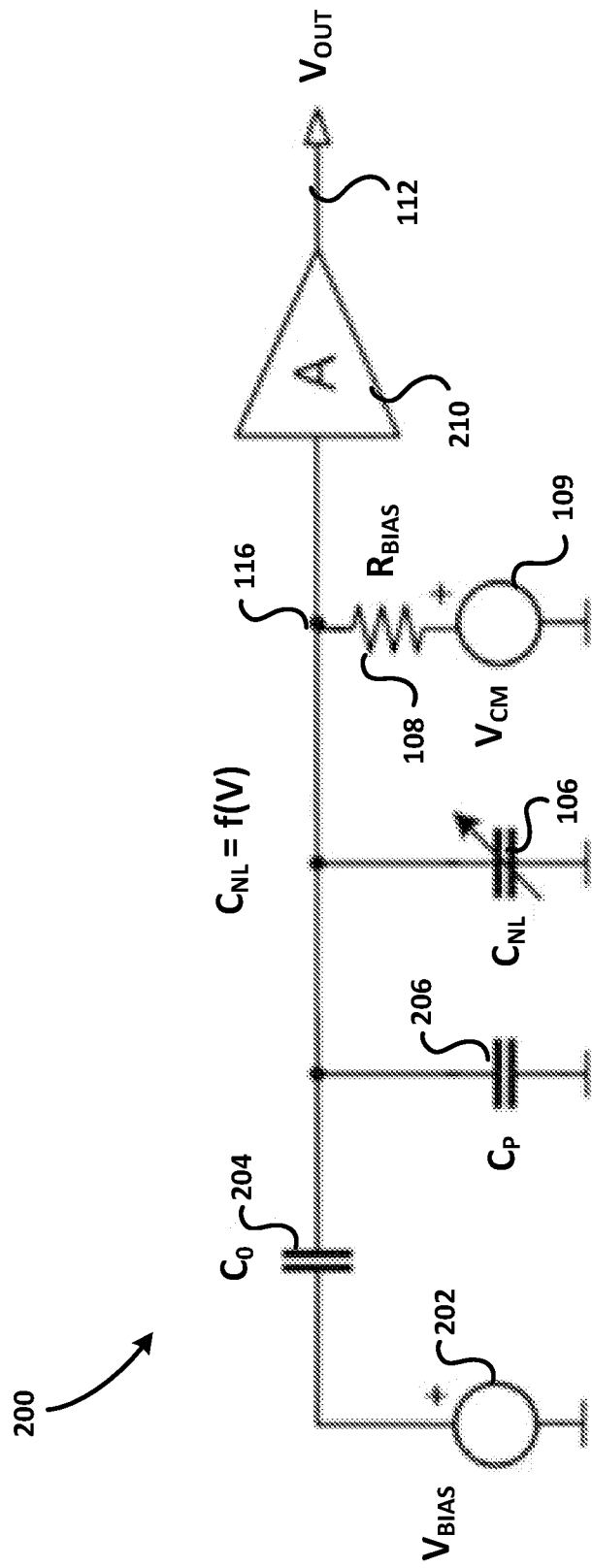
FIG. 2 is a schematic diagram of an equivalent circuit of a MEMS readout circuit including a parasitic capacitor, adding a nonlinear capacitor placed at an interface node and configured so that the sum of the charge stored on the parasitic capacitor and the nonlinear capacitor is essentially constant according to an embodiment.

FIG. 2 is a schematic diagram of an equivalent circuit 200 of a MEMS readout circuit including a bias voltage source $V_{BIAS}$ 202, a MEMS related capacitance Co 204, parasitic capacitor $C_P$ 206, and adding a nonlinear capacitor $C_{NL}$ 106 placed at an interface node 116 and configured so that the sum of the charge stored on the parasitic capacitor $C_P$ and the nonlinear capacitor $C_{NL}$ is essentially constant according to an embodiment. Equivalent circuit 200 also includes the bias resistor $R_{BIAS}$ 108 coupled to the $V_{CM}$ common mode voltage source 109 and an amplifier 210 coupled between interface node 116 and output node 112 ($V_{OUT}$). Amplifier 210 can comprise a model of a PMOS transistor in a source follower configuration, a programmable gain amplifier, or any other suitable amplifier used in the MEMS readout circuit.

As previously noted, the MEMS device is usually biased by employing the constant charge approach. Any change in the MEMS related capacitance Co between membrane and backplate causes a change of the voltage at the interface node. For larger signals a portion of the constant charge gets stored onto $C_P$ causing a loss of charge in Co. This undesired charge sharing between Co and $C_P$ is the root cause for HD2. As shown in FIG. 2, adding a nonlinear capacitor placed on purpose at the interface node so that it counter acts to the charge transfer will mitigate the nonlinearity. The signal dependent variation of capacitance will keep the sum of the charge stored onto $C_P$ and $C_{NL}$ almost constant.

Figure 3A:
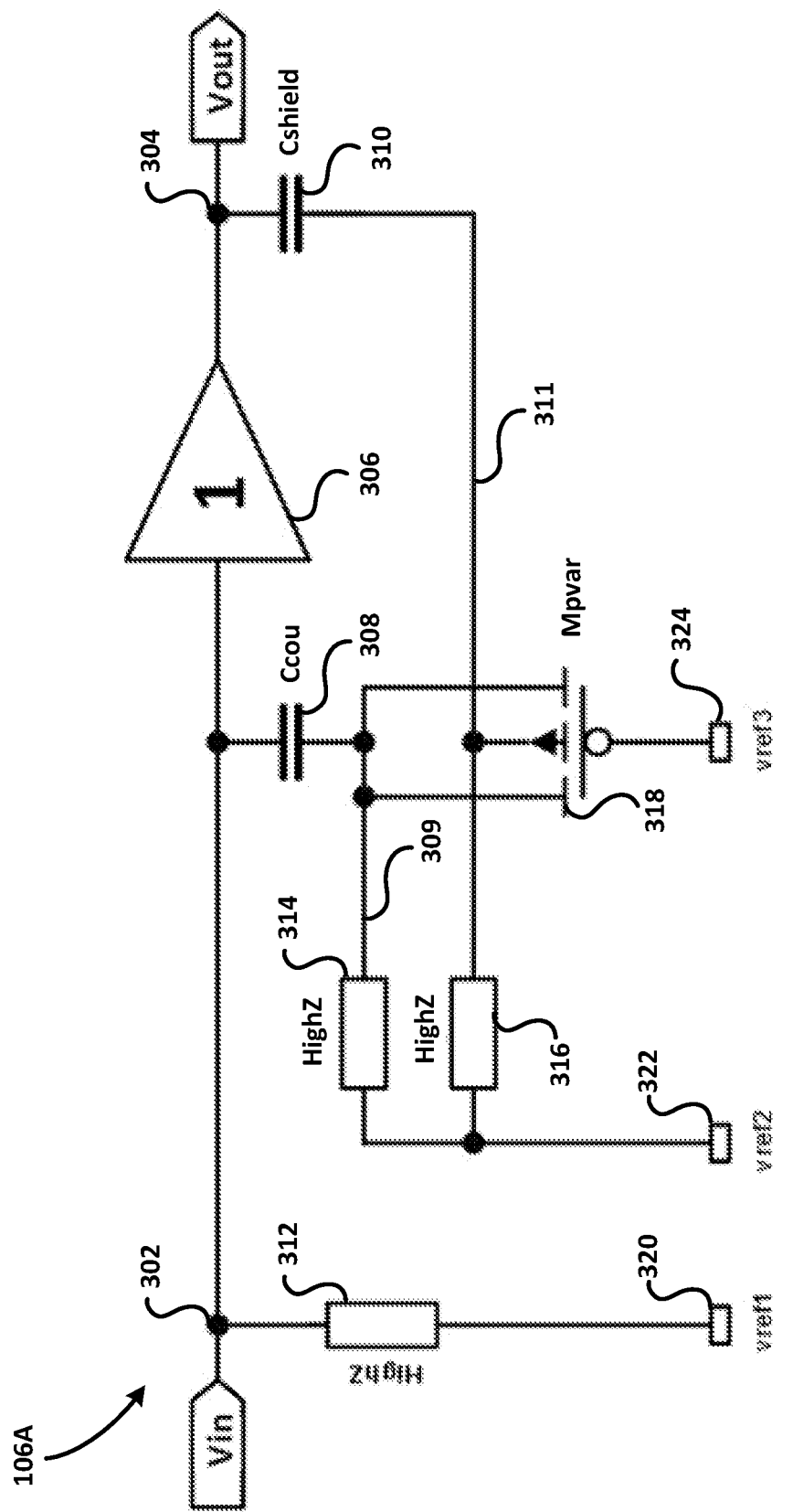
FIG. 3A is a schematic diagram of the nonlinear capacitor shown in FIG. 2, according to an embodiment.

FIG. 3A is a schematic diagram of a nonlinear capacitor 106A of the type shown in FIG. 2, according to an embodiment. The voltage at the interface between the MEMS device and the ASIC including the readout circuit as well as other components, is denoted as $V_{IN}$ at $V_{IN}$ node 302. $V_{IN}$ node 302 is therefore the input to the ASIC. The "highZ" impedance 332 (that can have an impedance value between 100 GOhm and one TOhm) is required for using constant charge biasing. The nonlinear capacitor 106B is implemented by a PMOS transistor 318 employing the nonlinear behavior of the gate-to-source/gate-to-drain capacitance. Generally, with respect to FIG. 2, the nonlinear capacitor $C_{NL}$ adds capacitance to parasitic capacitor $C_P$, which in turn creates a capacitive voltage divider for the MEMS motor sensitivity (MEMS capacitor Co). In other words, as the sum of $C_P+C_{NL}$ increases, the value of $V_{IN}$ decreases. Thus, nonlinear capacitor $C_{NL}$ is made as small as possible to avoid additional damping of the input signal, causing a decreased signal-to-noise ratio. Thus, the size of the nonlinear capacitor CNL is selected as described herein in order to minimize the HD2 harmonic distortion. As is explained in further detail below, the nonlinear capacitor is a series connection of a coupling capacitor $C_{COU}$ and a PMOS capacitor resulting in a reduced total capacitance. The coupling capacitor $C_{COU}$ is used for AC coupling between $V_{IN}$ node 302 and node 309 allowing different DC operational voltages at these two nodes.

The schematic diagram of nonlinear capacitor 106A includes a $V_{IN}$ node 302 and a $V_{OUT}$ node 304. These two nodes replace the interface nodes 116 and 112 shown in FIG. 2. A HighZ bias resistor 312 is coupled between $V_{IN}$ node 302 and a first reference node 320. The first reference node is configured for receiving a first reference voltage $V_{REF}1$. A coupling capacitor $C_{COU}$ 308 is coupled between $V_{IN}$ node 302 and node 309. A HighZ bias resistor 314 is coupled between node 309 and second reference node 322. The second reference node is configured for receiving a second reference voltage $V_{REF2}$. A HighZ bias resistor 316 is coupled between node 311 and second reference node 322. A PMOS transistor 318 is coupled between node 309 and a third reference node 324. The third reference node 324 is configured for receiving a third reference voltage $V_{REF3}$. In particular, the drain and source of PMOS transistor 318 are coupled to node 309, the bulk node of PMOS transistor 318 is coupled to node 311, and the gate node of PMOS transistor 318 is coupled to third reference node 324. In addition to the above described components, nonlinear capacitor 106A includes a unity gain amplifier 306 having an input coupled to $V_{IN}$ node 302 and an output coupled to $V_{OUT}$ node 304. Finally, a shield capacitor $C_{SHIELD}$ 310 is coupled between $V_{OUT}$ node 304 and node 311. The function of the shield capacitor and other components of the nonlinear capacitor is explained in further detail below.

Figure 3B:
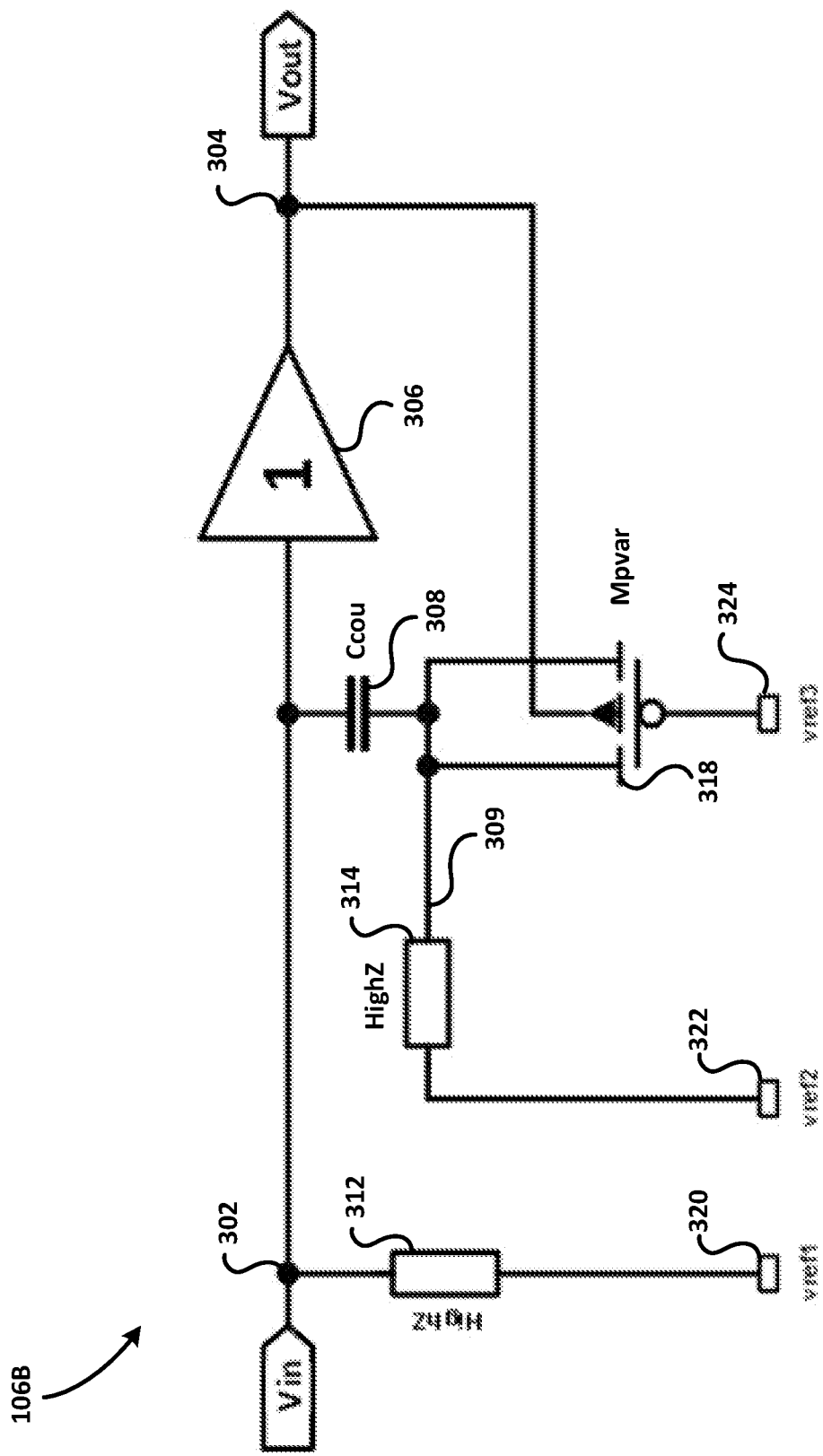
FIG. 3B is a schematic diagram of the nonlinear capacitor shown in FIG. 2, according to another embodiment.

FIG. 3B is a schematic diagram of a nonlinear capacitor 106B shown in FIG. 2, according to another embodiment. Nonlinear capacitor 106B includes HighZ bias resistor 312, HighZ bias resistor 314, coupling capacitor $C_{COU}$ 308, PMOS transistor 318, and unity gain amplifier 306, all previously discussed. Nonlinear capacitor 106B also includes $V_{IN}$ node 302, $V_{OUT}$ node 304, first reference node 320, second reference node 322, and third reference node 324, all previously discussed. In pertinent part, nonlinear capacitor only includes two HighZ bias resistors and one capacitor. Thus, the bulk node of PMOS transistor 318 is directly coupled to $V_{OUT}$ node 304.

Figure 4:
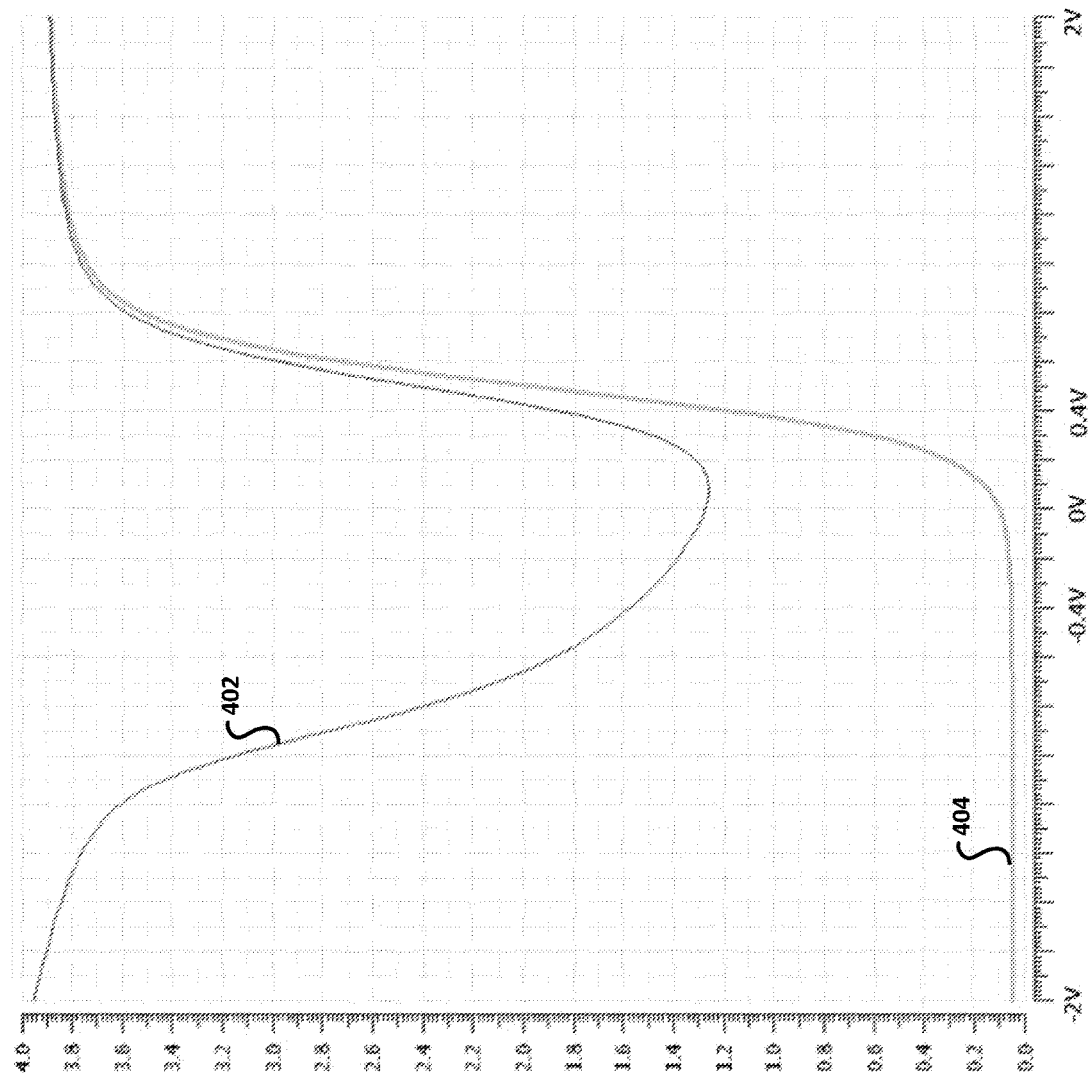
FIG. 4 is a graph of the simulated nonlinearity of the PMOS device shown in FIGS. 3A and 3B.

The simulated nonlinearity of the PMOS transistor 318 is illustrated in FIG. 4. A voltage sweep is done from −2V to +2V to reveal the C-to-V characteristic 400. Trace 402 demonstrates the known behavior of an MOS capacitor when source-drain-bulk are connected together (short-circuit). Note that trace 402 never drops down to a zero capacitance value, which results in a remaining capacitance in addition to the parasitic capacitance CF.

Referring generally to FIG. 3A and to FIG. 4, the bulk node of the PMOS transistor 318 is driven by the output voltage of the nonlinear capacitor which is a copy of the input voltage of the nonlinear capacitor. Capacitor $C_{SHIELD}$ is chosen such that the node voltages at the PMOS drain/source is equal to the bulk voltage. The separation of source-drain-terminal from bulk-terminal by providing a copy of node voltages yields to a shift of the C-to-V characteristic (of trace 404) by keeping the desired nonlinear C-to-V behavior. This holds also true in the presence of large signal swings. Note that trace 404 drops down close to zero yielding a small total PMOS transistor capacitance.

In an embodiment, a programming feature to control the nonlinearity of the PMOS device is used to cope with the process spread of MEMS nonlinearity. An embodiment implementation uses a programmable reference voltage Vref3 (see FIG. 3) applied to the PMOS gate. Additionally, several switchable unit elements can be placed in parallel to further enlarge the parameter space. (Such a unit element comprises capacitor $C_{COU}$, PMOS transistor 318 and shield capacitor $C_{SHIELD}$ 310). As a further control feature, the reference voltage Vref2 can be programmed in different steps to change the effective voltage between the gate and channel of the PMOS transistor 318.

Figure 5:
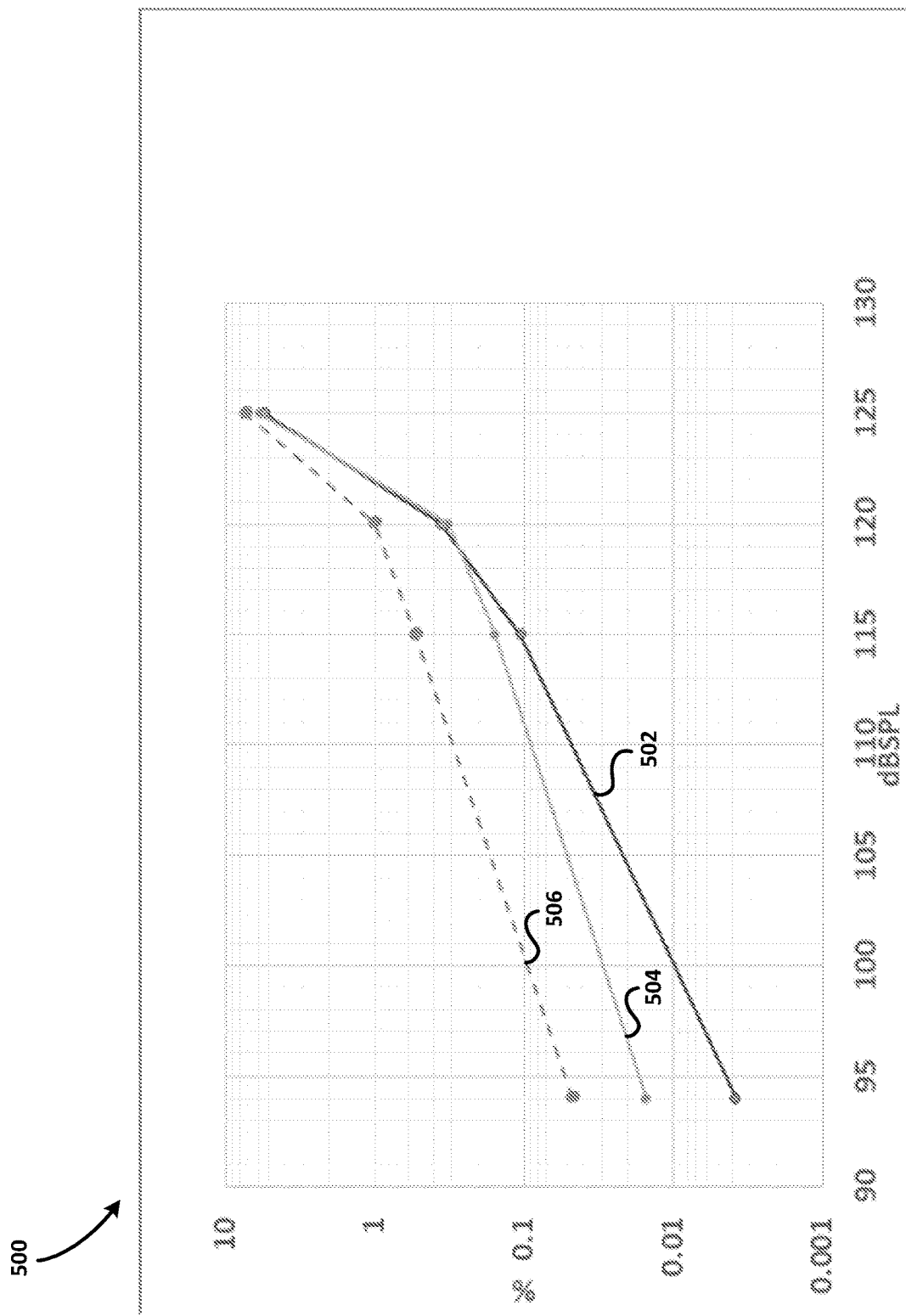
FIG. 5 is a graph of a system simulation including a MEMS-model and a readout path configured according to a plurality of predetermined nonlinearity codes, according to an embodiment.

A graph 500 based on a system simulation of a MEMS-model and a readout path is shown in FIG. 5. The total harmonic distortion (THD) is evaluated over different sound pressure levels (SPL). Dependent on chosen programming codes different THD behaviors can be achieved. In the simulation 32 codes were implemented by four different biasing voltages of Vref3 and eight switchable unit elements, and only two were graphed for clarity. The dashed trace 506 shows the THD without any nonlinearity compensation, where the THD of 0.1% is already crossed at 100 dB SPL. Trace 504 shows the compensated results based upon one of the codes, which improves performance by about 10 dB. Trace 502 shows the compensated results based upon another code, which improves performance by about 15 dB. The THD performance is improved by ~20 dB below 110 dBSPL. A proper choice of code can push the 0.1% THD crossing point to larger SPL by 15 dB, in some embodiments. Different codes can yield an improved total system linearity for different MEMS types having different nonlinearities.

Figure 6:
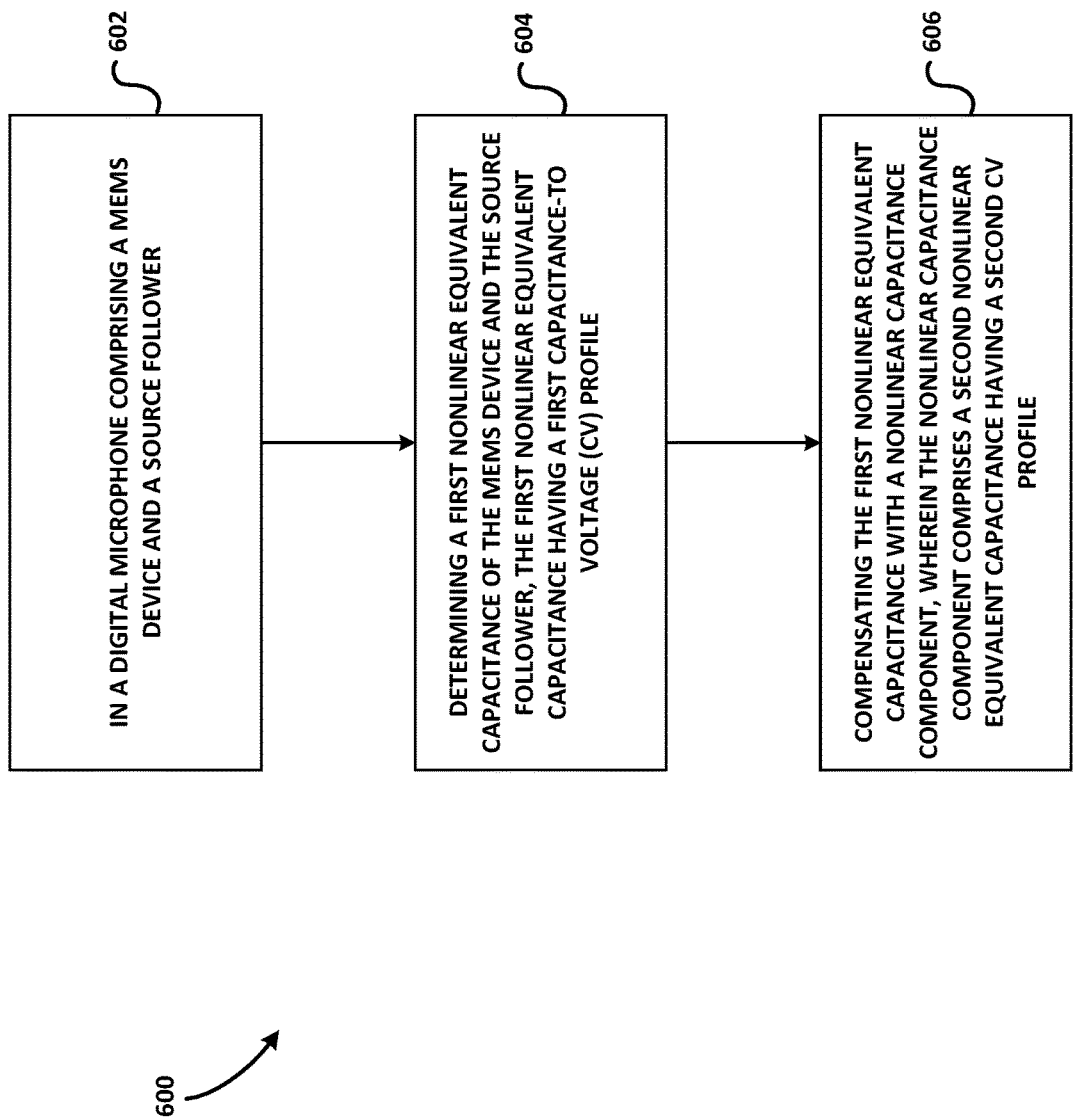
FIG. 6 is a flow chart of a capacitive linearization method applied to a MEMS microphone system, according to an embodiment.

FIG. 6 is a flow chart of a capacitive linearization method 600 applied to a MEMS microphone system, according to an embodiment, wherein the method comprises, in a microphone comprising a MEMS device and a source follower at preliminary step 602, determining a first nonlinear equivalent capacitance of the MEMS device and the source follower, the first nonlinear equivalent capacitance having a first capacitance-to-voltage (CV) profile at step 604; and compensating the first nonlinear equivalent capacitance with a nonlinear capacitance component, wherein the nonlinear capacitance component comprises a second nonlinear equivalent capacitance having a second CV profile 606.

Figure 7:
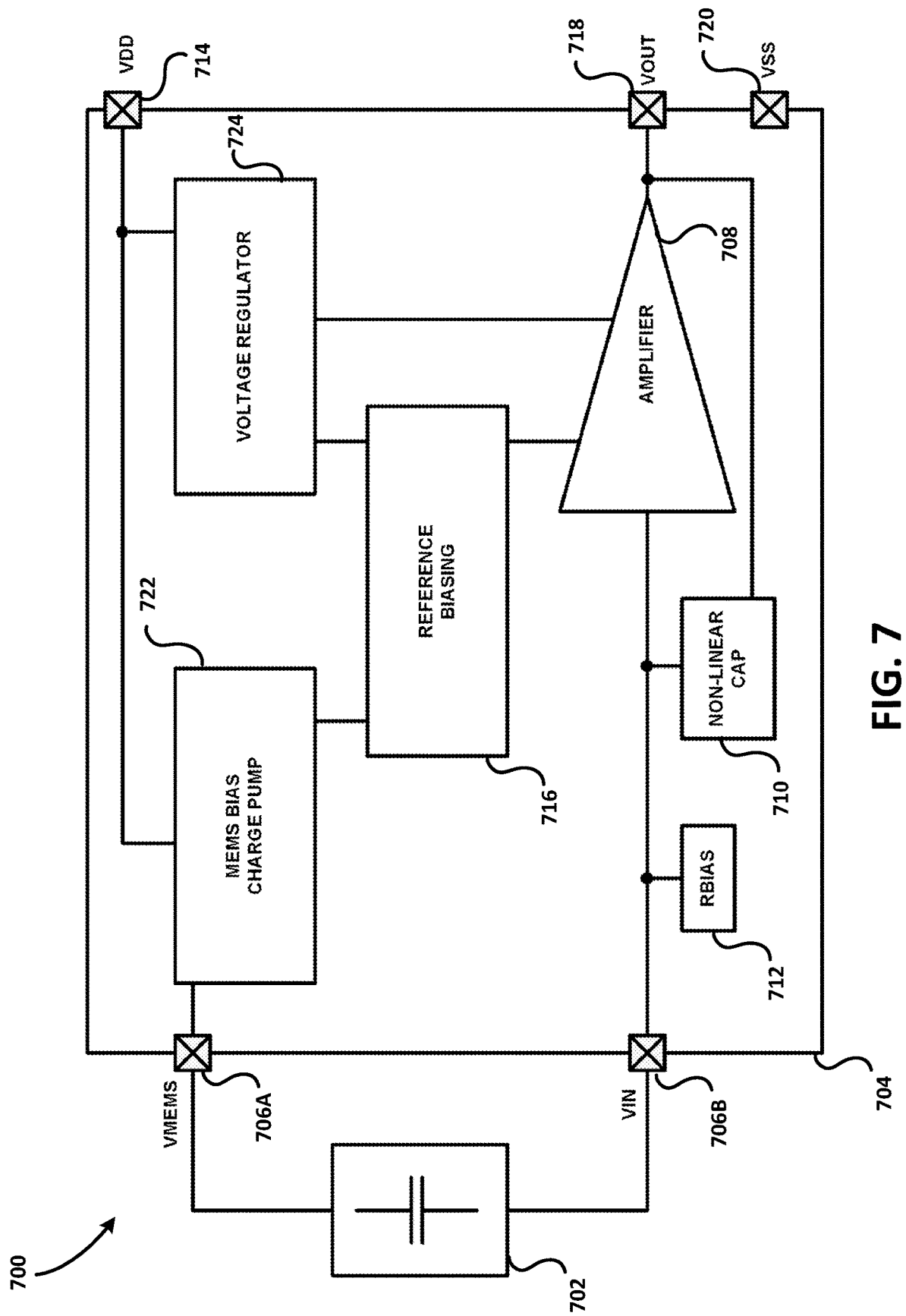
FIG. 7 is a block diagram of a MEMS microphone system, according to an embodiment.

FIG. 7 is a block diagram of a MEMS microphone system 700 including a MEMS device 702 for converting sounds waves into an analog signal, and an ASIC 704 for receiving the analog signal and for biasing MEMS device 702 through $V_{MEMS}$ ASIC pad 706A and $V_{IN}$ ASIC pad 706B, according to an embodiment. MEMS device 702 can comprise a silicon variable capacitance device, in an embodiment. ASIC 704 comprises a plurality of analog, digital, and mixed signal components, including an amplifier 708 for amplifying the signal provided by MEMS device. Amplifier 708 can thus include a source follower transistor and can have a programmable gain in some embodiments. The output of amplifier 708 is coupled to the $V_{OUT}$ ASIC pad 718. ASIC 704 also includes a bias resistor $R_{BIAS}$ 712, nonlinear capacitor 710, MEMS bias charge pump 722, voltage regulator 724, and reference biasing circuit 716. ASIC 704 can have additional analog and digital components in some embodiments. ASIC 704 also has a power supply pad 714 for receiving the VDD power supply voltage and a power supply pad 720 for receiving the VSS power supply voltage. ASIC 704 can have additional integrated circuit pads in some embodiments. MEMS device 702 can be fabricated in a single package, and ASIC 704 can also be fabricated in a single package, wherein both packages are affixed to a single printed circuit board and offered as a single MEMS microphone system product. In another embodiment, MEMS device 702 and ASIC 704 can be fabricated together in a single package.

In summary, a digital microphone system has been shown and described, comprising a microelectromechanical system (MEMS) device responsive to sound waves or vibrations having an output coupled to a first node; a source follower having an input coupled to a second node, and an output for generating an analog signal, wherein the MEMS device output and the source follower input comprise a first nonlinear equivalent capacitance having a first capacitance-to-voltage (CV) profile; and a nonlinear capacitance component coupled to the first node, the second node, and at least one reference voltage node, wherein the nonlinear capacitance component comprises a second nonlinear equivalent capacitance having a second CV profile. The first capacitance-to-voltage profile is determined by the capacitor divider circuit including the MEMS device capacitance that is coupled to the parasitic capacitor as previously described. The second capacitance-to-voltage profile is determined by the capacitance profile of the nonlinear capacitor as previously described. The second capacitance-to-voltage profile thus compensates the first capacitance-to-voltage profile in a manner such that the HD2 harmonic component is substantially minimized.

Example embodiments of the present invention are summarized here. Other embodiments can also be understood from the entirety of the specification and the claims filed herein.

Example 1. According to an embodiment, a microphone includes a microelectromechanical system (MEMS) device responsive to sound waves or vibrations having an output coupled to a first node; a programmable amplifier or source follower having an input coupled to a second node, and an output for generating an analog signal, wherein the MEMS device output and the programmable amplifier or source follower input include a first nonlinear equivalent capacitance having a first capacitance-to-voltage (CV) profile; and a nonlinear capacitance component coupled to the first node, the second node, and at least one reference voltage node, wherein the nonlinear capacitance component includes a second nonlinear equivalent capacitance having a second CV profile.

Example 2. The microphone of Example 1, wherein the nonlinear capacitance component includes a capacitor-connected transistor.

Example 3. The microphone of any of the above examples, wherein a transistor of the programmable amplifier or source follower and the capacitor-connected transistor include a same transistor type.

Example 4. The microphone of any of the above examples, wherein the nonlinear capacitance component includes a first capacitor coupled between the first node and a third node; and a capacitor-connected transistor coupled between the third node and a first reference node.

Example 5. The microphone of any of the above examples, wherein the nonlinear capacitance component further includes a second capacitor coupled between the second node and a fourth node.

Example 6. The microphone of any of the above examples, wherein the nonlinear capacitance component further includes a unity gain amplifier coupled between the first node and the second node.

Example 7. The microphone of any of the above examples, wherein the nonlinear capacitance component further includes a first bias resistor coupled between the third node and a second reference node.

Example 8. The microphone of any of the above examples, wherein the nonlinear capacitance component further includes a second bias resistor coupled between a fourth node and the second reference node.

Example 9. The microphone of any of the above examples, wherein the nonlinear capacitance component further includes a third bias resistor coupled between the first node and a third reference node.

Example 10. The microphone of any of the above examples, wherein a bulk node of the capacitor-connected transistor is coupled to the second node.

Example 11. According to an embodiment, an integrated circuit includes a first bias resistor coupled between an input pin and at least one reference voltage; a nonlinear capacitance component including a capacitor-connected transistor, wherein the nonlinear capacitance component is coupled to the input pin, an internal node, and at least one reference voltage node; and a source follower coupled to the internal node.

Example 12. The integrated circuit of Example 11, further including an analog-to-digital converter (ADC) coupled to the source follower; and a digital signal processing component coupled between the ADC and an output pin.

Example 13. The integrated circuit of any of the above examples, wherein a transistor of the source follower and the capacitor-connected transistor include a same transistor type.

Example 14. The integrated circuit of any of the above examples, wherein the nonlinear capacitance component includes a first capacitor coupled between a coupled source and drain of the capacitor-connected transistor and the input pin.

Example 15. The integrated circuit of any of the above examples, wherein the nonlinear capacitance component further includes a second capacitor coupled between a bulk node of the capacitor-connected transistor and the internal node.

Example 16. According to an embodiment, a method includes in a digital microphone including a MEMS device and a programmable gain amplifier or source follower, determining a first nonlinear equivalent capacitance of the MEMS device and the programmable gain amplifier or source follower, the first nonlinear equivalent capacitance having a first capacitance-to-voltage (CV) profile; and compensating the first nonlinear equivalent capacitance with a nonlinear capacitance component, wherein the nonlinear capacitance component includes a second nonlinear equivalent capacitance having a second CV profile.

Example 17. The method of Example 16, wherein the nonlinear capacitance component includes a capacitor-connected transistor.

Example 18. The method of any of the above examples, wherein the nonlinear capacitance component further includes at least one voltage reference node, and at least one capacitor coupled to a capacitor switching node.

Example 19. The method of any of the above examples, further including switching the one voltage reference node between a first voltage value and a second voltage value.

Example 20. The method of any of the above examples, further including switching the capacitor switching node between a first voltage associated with a first capacitor value, and a second voltage associated with a second capacitor value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A microphone comprising:
   a microelectromechanical system (MEMS) device responsive to sound waves or vibrations having an output coupled to a first node;
   a programmable gain amplifier or source follower having an input coupled to a second node, and an output for generating an analog signal, wherein the MEMS device output and the programmable gain amplifier or source follower input comprise a first nonlinear equivalent capacitance having a first capacitance-to-voltage (CV) profile; and
   a nonlinear capacitance component coupled to the first node, the second node, and at least one reference voltage node, wherein the nonlinear capacitance component comprises a second nonlinear equivalent capacitance having a second CV profile.

2. The microphone of claim 1, wherein the nonlinear capacitance component comprises a capacitor-connected transistor.

3. The microphone of claim 2, wherein a transistor of the programmable gain amplifier or source follower and the capacitor-connected transistor comprise a same transistor type.

4. The microphone of claim 1, wherein the nonlinear capacitance component comprises:
   a first capacitor coupled between the first node and a third node; and
   a capacitor-connected transistor coupled between the third node and a first reference node.

5. The microphone of claim 4, wherein the nonlinear capacitance component further comprises a second capacitor coupled between the second node and a fourth node.

6. The microphone of claim 4, wherein the nonlinear capacitance component further comprises a unity gain amplifier coupled between the first node and the second node.

7. The microphone of claim 4, wherein the nonlinear capacitance component further comprises a first bias resistor coupled between the third node and a second reference node.

8. The microphone of claim 7, wherein the nonlinear capacitance component further comprises a second bias resistor coupled between a fourth node and the second reference node.

9. The microphone of claim 7, wherein the nonlinear capacitance component further comprises a third bias resistor coupled between the first node and a third reference node.

10. The microphone of claim 4, wherein a bulk node of the capacitor-connected transistor is coupled to the second node.

11. An integrated circuit comprising:
a first bias resistor coupled between an input pin and at least one reference voltage;
a nonlinear capacitance component comprising a capacitor-connected transistor, wherein the nonlinear capacitance component is coupled to the input pin, an internal node, and
at least one reference voltage node; and
a source follower coupled to the internal node.

12. The integrated circuit of claim 11, further comprising:
an analog-to-digital converter (ADC) coupled to the source follower; and
a digital signal processing component coupled between the ADC and an output pin.

13. The integrated circuit of claim 11, wherein a transistor of the source follower and the capacitor-connected transistor comprise a same transistor type.

14. The integrated circuit of claim 11, wherein the nonlinear capacitance component comprises a first capacitor coupled between a coupled source and drain of the capacitor-connected transistor and the input pin.

15. The integrated circuit of claim 14, wherein the nonlinear capacitance component further comprises a second capacitor coupled between a bulk node of the capacitor-connected transistor and the internal node.

16. A method comprising:
in a digital microphone comprising a MEMS device and a programmable amplifier or source follower,
determining a first nonlinear equivalent capacitance of the MEMS device and the programmable amplifier or source follower, the first nonlinear equivalent capacitance having a first capacitance-to-voltage (CV) profile; and
compensating the first nonlinear equivalent capacitance with a nonlinear capacitance component, wherein the nonlinear capacitance component comprises a second nonlinear equivalent capacitance having a second CV profile.

17. The method of claim 16, wherein the nonlinear capacitance component comprises a capacitor-connected transistor.

18. The method of claim 17, wherein the nonlinear capacitance component further comprises at least one voltage reference node, and at least one capacitor coupled to a capacitor switching node.

19. The method of claim 18, further comprising switching the at least one one voltage reference node between a first voltage value and a second voltage value.

20. The method of claim 18, further comprising switching the capacitor switching node between a first voltage associated with a first capacitor value, and a second voltage associated with a second capacitor value.

* * * * *